US010545740B2

(12) United States Patent
Al-Hagri (10) Patent No.: US 10,545,740 B2
(45) Date of Patent: Jan. 28, 2020

(54) DISTRIBUTED AGENT TO COLLECT INPUT AND OUTPUT DATA ALONG WITH SOURCE CODE FOR SCIENTIFIC KERNELS OF SINGLE-PROCESS AND DISTRIBUTED SYSTEMS

(71) Applicant: Saudi Arabian Oil Company, Dhahran (SA)

(72) Inventor: Mazen Abdulaziz Saleh Al-Hagri, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 88 days.

(21) Appl. No.: 15/792,881

(22) Filed: Oct. 25, 2017

(65) Prior Publication Data

US 2019/0121624 A1 Apr. 25, 2019

(51) Int. Cl.
*G06F 9/45* (2006.01)
*G06F 8/41* (2018.01)
(Continued)

(52) U.S. Cl.
CPC .......... *G06F 8/4434* (2013.01); *G06F 9/4491* (2018.02); *G06F 11/366* (2013.01); *G06N 20/00* (2019.01); *G06F 9/451* (2018.02)

(58) Field of Classification Search
CPC ...... G06F 9/4491; G06F 9/451; G06F 8/4434; G06F 11/366; G06N 20/00
(Continued)

(56) References Cited

U.S. PATENT DOCUMENTS 5,493,675 A * 2/1996 Faiman, Jr. ............. G06F 8/433
717/144
5,640,491 A * 6/1997 Bhat ...................... B01D 3/425
706/23
(Continued)

OTHER PUBLICATIONS

Title: Jump-oriented programming: a new class of code-reuse attack, author: T Bletsch, published 2011.*
(Continued)

*Primary Examiner* — Chameli Das
(74) *Attorney, Agent, or Firm* — Bracewell LLP; Constance G. Rhebergen; Ryan B. McBeth (57) ABSTRACT

An improved software optimization tool framework is provided that, when executed, creates software agents that attach themselves to all running instances of a user-specified application and/or process, be it in a single machine or across multiple machines (e.g. in a computer cluster). Once the software agents attach, for each attached application and/or process, the tool can be configured to capture the input and output data of specified target sections of code for the specified application or process. In an embodiment, a software programmer may want to optimize a specific target section of code that may comprise a single function or multiple functions or code portions. Based on pre-identified code sections, the tool can write captured input and output data into binary files, along with the target sections of code, and build an optimization framework around the input and output data, including the targeted sections of code. An optimization engineer can then use this optimization framework to develop optimized versions of the target code sections and can further test the optimized code section against actual data and results obtained from original runs.

16 Claims, 3 Drawing Sheets

(51) Int. Cl.
    *G06F 11/36* (2006.01)
    *G06F 9/448* (2018.01)
    *G06N 20/00* (2019.01)
    *G06F 9/451* (2018.01)

(58) Field of Classification Search
    USPC .......................................................... 717/153
    See application file for complete search history.

(56) References Cited

U.S. PATENT DOCUMENTS

| | | | |
|---|---|---|---|
| 6,158,049 | A | 12/2000 | Goodwin et al. |
| 7,689,558 | B2 | 3/2010 | Rossmann |
| 7,716,643 | B2 | 5/2010 | Goldin |
| 7,900,193 | B1* | 3/2011 | Kolawa ............... G06F 11/3604 717/126 |
| 8,527,624 | B2 | 9/2013 | Chen et al. |
| 8,881,143 | B2 | 11/2014 | Prabhakaran et al. |
| 9,027,006 | B2 | 5/2015 | Pizlo et al. |
| 2008/0086464 | A1* | 4/2008 | Enga ................... G06F 16/9537 |
| 2008/0178157 | A1* | 7/2008 | Winberg ................ G06F 8/41 717/128 |
| 2009/0106741 | A1* | 4/2009 | Dageville ........... G06F 11/3636 717/128 |
| 2009/0138415 | A1* | 5/2009 | Lancaster ............... G06N 5/04 706/11 |
| 2011/0106527 | A1* | 5/2011 | Chiu .................. H04M 3/4936 704/9 |
| 2012/0084759 | A1* | 4/2012 | Candea .............. G06F 11/3612 717/126 |
| 2012/0324359 | A1 | 12/2012 | Lee et al. |
| 2013/0036403 | A1 | 2/2013 | Geist |
| 2013/0085882 | A1 | 4/2013 | Gounares et al. |
| 2014/0279883 | A1* | 9/2014 | Kostenko .............. G06F 9/5061 707/618 |
| 2015/0288664 | A1* | 10/2015 | Murray .................. G06F 16/00 713/165 |
| 2015/0339217 | A1* | 11/2015 | Avgerinos ........... G06F 11/3608 717/132 |
| 2018/0101299 | A1* | 4/2018 | Petkov ................ G06F 3/03545 |

OTHER PUBLICATIONS

Title: Modeling impacts of process architecture on cost and schedule risk in product development, author: TR Browning et al, published on 2002.*

The International Search Report and Written Opinion for related PCT application PCT/US2018/056082 dated Jan. 22, 2019.

Dao et al., "Live Debugging of Distributed Systems", Lecture Notes in Computer Science, 2009, pp. 94-108, Springer-Verlag Berlin Heidelberg.

Irani, "GCP Stackdriver Tutorial: Debug Snapshots, Traces, Logging and Logpoints", https://rominirani.com/gcp-stackdriver-tutorial-debug-snapshots-traces-logging-and-logpoints-1ba49e4780e6, 2019, pp. 20.

Lee et al., "A Development of Remote Tracepoint Debugger for Run-time Monitoring and Debugging of Timing Constraints on Qplus-P RTOS", Workshop on Software Technologies for Future Embedded Systems, 2003, pp. 4, IEEE.

* cited by examiner

DISTRIBUTED AGENT TO COLLECT INPUT
AND OUTPUT DATA ALONG WITH SOURCE
CODE FOR SCIENTIFIC KERNELS OF
SINGLE-PROCESS AND DISTRIBUTED
SYSTEMS

FIELD OF THE INVENTION

Embodiments of the present disclosure relate to software and program code optimization.

BACKGROUND OF THE INVENTION

Computer software can often benefit from optimization efforts that make the software more efficient. Computer software and program code optimization has generally been known, though it is typically manually performed through trial and experimentation by computer programmers and software engineers. Often, a computer programmer will program in specific optimization data output routines in functions and program segments that they are seeking to optimize. This is often a highly customized and time consuming process and the data that is output will often need to be manually analyzed as well. Once the computer programmer or software engineer has some optimization output information, they can then analyze that information and consider what lessons might be learned from the data.

When considering optimization for scientific kernels of both single process and distributed systems, the mainstream prior approach involves modifying the source code of the original codebase specifically for every target kernel, in order to output the required data, then manually building an optimization framework around the extracted data. These changes to the original codebase can be lengthy and are often irrelevant to the flow of the code, hence they are normally temporary and intended to be removed from a given codebase before committing the source code. In fact, the removal process tends to be manually implemented and can occasionally result in artifacts being left in the code and thus inefficient final code being committed to a particular source code database.

Given these issues, there is a present need in the industry for advanced software and programming optimization methods that can reliably and accurately provide optimization output for both distributed and non-distributed computer software.

SUMMARY OF THE INVENTION

Embodiments of the present disclosure aim to provide advanced software and programming optimization techniques that can reliably and accurately provide optimization output for both distributed and non-distributed computer software.

The embodiments described herein aim to provide a novel method that can be implemented as a software tool which, when executed, creates multiple agents that attach themselves to all running instances of a user-specified application and/or process, be it in a single machine or across multiple machines (e.g., in a computer cluster). Once attached, and for each attached application and/or process, the tool captures the input and output data of specified target sections of code for the specified application and/or process. In an embodiment, a specified target section of code may comprise a single function or multiple functions or code portions. The tool can then write the captured input and output data into binary files, along with the target sections of code, and build an optimization framework around the input and output data, including the targeted sections of code. An optimization engineer can then use this optimization framework to write an optimized version of the target code section; testing the optimized version against actual data and results obtained from original runs. This actual data can also be referred to as non-synthesized data. By utilizing non-synthesized data, highly specific optimizations can be achieved by the engineers that are continuing to develop the source code for a given program.

This technique can be referred to as Kernel Optimization Framework Extraction and Encapsulation or "KOFEE."

According to at least one embodiment, there is provided a computer software optimization system for use in a non-distributed computing system comprising: a non-distributed computer system comprising, a micro-processor configured on a computer circuit board, the microprocessor configured with input/output channels, memory configured to be in communication with the micro-processor, a data bus extending between the memory and the micro-processor, non-volatile memory configured to be in communication with the micro-processor; user-interface such that a software programmer can view and revise source code on the computer system, and a software program stored on the non-volatile memory that enables the micro-processor to execute a central dispatcher program that takes as inputs: a name of a target process, a filename of a source code file, a set of line numbers identifying the targeted code sections in the source code file, a list of the variable names to be extracted, and an intended extraction frequency; the central dispatcher program configured to give control to a software agent identified by the name of the target process, the software agent configured to instruct the target process to pause when the first line number of the set of line numbers identifying the target code sections in the source code file is reached, run the target process and dump the variable values identified in the list of the variable names to be extracted to a dump data file, and then repeat this process until a desired number of iterations has been achieved.

According to an embodiment, the central dispatcher receives as input the codebase of the application and the dump data file from the software agent.

According to an embodiment, the central dispatcher receives as input a pre-configured optimization framework file.

According to an embodiment, the central dispatcher is configured to populate the pre-configured optimization framework file with information from the dump data file and the relevant code sections from the codebase of the application identified by the set of line numbers identifying the targeted code sections in the source code file, thereby creating a populated optimization framework file.

According to an embodiment, the computer software optimization system displays to an end user computer programmer, the populated optimization framework file and an editable version of the relevant code sections from the codebase of the application identified by the set of line numbers identifying the targeted code sections in the source code file.

According to an embodiment, the computer software optimization system is configured to re-run edited versions of the relevant code sections using the variable data from the dump data file to thereby provide test runs with actual runtime data.

According to an embodiment, a method of computer software optimization is provided for use in a non-distributed computing system, the method comprising the following steps: deploying a non-distributed computer system comprising, a micro-processor configured on a computer circuit board, the microprocessor configured with input/output channels, memory configured to be in communication with the micro-processor, a data bus extending between the memory and the micro-processor, non-volatile memory configured to be in communication with the micro-processor; a user-interface such that a software programmer can view and revise source code on the computer system, and a software program stored on the nonvolatile memory that enables the micro-processor to perform the following steps: executing a central dispatcher program that receives as inputs: a name of a target process, a filename of a source code file, a set of line numbers identifying the targeted code sections in the source code file, a list of the variable names to be extracted, and an intended extraction frequency; executing a software agent program, the software agent program identified by the name of the target process and configured to instruct the target process to pause when the first line number of the set of line numbers identifying the target code sections in the source code file is reached, run the target process and dump the variable values identified in the list of the variable names to be extracted to a dump data file, and then repeat this process until a desired number of iterations has been achieved.

According to an embodiment, the central dispatcher receives as input the codebase of the application and the dump data file from the software agent.

According to an embodiment, the central dispatcher receives as input a pre-configured optimization framework file.

According to an embodiment, the central dispatcher is configured to populate the pre-configured optimization framework file with information from the dump data file and the relevant code sections from the codebase of the application identified by the set of line numbers identifying the targeted code sections in the source code file, thereby creating a populated optimization framework file.

According to an embodiment, the computer software optimization system displays to an end user computer programmer, the populated optimization framework file and an editable version of the relevant code sections from the codebase of the application identified by the set of line numbers identifying the targeted code sections in the source code file.

According to an embodiment, the computer software optimization system is configured to re-run an edited version of the relevant code sections using the variable data from the dump data file to thereby provide test runs with actual runtime data.

According to an embodiment, the computer software optimization system is configured to create a new dump data file during the re-run of the edited version of the relevant code section.

According to an embodiment, a method of computer software optimization is provided for use in a distributed computing system, the method comprising the following steps:

deploying two or more computer systems, each computer system comprising, a micro-processor configured on a computer circuit board, the microprocessor configured with input/output channels, memory configured to be in communication with the micro-processor, a data bus extending between the memory and the micro-processor, non-volatile memory configured to be in communication with the micro-processor; a user-interface such that a software programmer can view and revise source code on the computer system, and a software program stored on the nonvolatile memory of at least one computer system that enables the micro-processor to perform the following steps: executing a central dispatcher program that receives as inputs: a name of a target process, a filename of a source code file, a set of line numbers identifying the targeted code sections in the source code file, a list of the variable names to be extracted, and an intended extraction frequency; a software program stored on the nonvolatile memory of each of the configured computer systems that enables the micro-processor of each system to perform the following steps: executing a software agent program, the software agent program identified by the name of the target process and configured to instruct the target process to pause when the first line number of the set of line numbers identifying the target code sections in the source code file is reached, run the target process and dump the variable values identified in the list of the variable names to be extracted to a dump data file, and then repeat this process until a desired number of iterations has been achieved, the software program stored on the nonvolatile memory of the at least one computer system further performing the following steps: collecting the dump data file from each of the software agent programs.

According to an embodiment, the central dispatcher receives as input the codebase of the application and the contents of dump data files from each of the software agents.

According to an embodiment, the central dispatcher receives as input a pre-configured optimization framework file that is adapted to be populated with information from a distributed computing system.

According to an embodiment, the central dispatcher is configured to populate the pre-configured optimization framework file with information from the dump data files and the relevant code sections from the codebase of the application identified by the set of line numbers identifying the targeted code sections in the source code file, thereby creating a populated optimization framework file for a distributed computing system.

According to an embodiment, the computer software optimization system displays to an end user computer programmer, the populated optimization framework file and an editable version of the relevant code sections from the codebase of the application identified by the set of line numbers identifying the targeted code sections in the source code file.

According to an embodiment, the computer software optimization system is configured to re-run edited versions of the relevant code sections using the variable data from the dump data file to thereby provide test runs with actual runtime data.

BRIEF DESCRIPTION OF THE DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

Embodiments described below relate to a software optimization system and the below glossary of common terms is provided to aid in the understanding of this system:

- Software optimization: The process of modifying a software system to make some aspect of it work more efficiently or use fewer resources.
- Process: An instance of a computer program that is being executed.
- Source Code: The version of software as it is originally written by a human in plain text.
- Variable: A symbolic name in the source code, associated with a value at execution time, and whose associated value may be changed.
- Binary dump: The operation of copying the contents of a computer memory in binary form onto an external storage device.
- Kernel: A software procedure in the source code that performs a common numerical operation.
- Optimization framework: Supporting software that can aid in implementing, verifying and evaluating software optimizations around a specific kernel.
- Computer cluster: A set of loosely or tightly connected computers that work together so that they can be viewed as a single system.
- KOFEE: The name of method discussed in this work. Acronym for Kernel Optimization Framework Extraction and Encapsulation.

Figure 1:
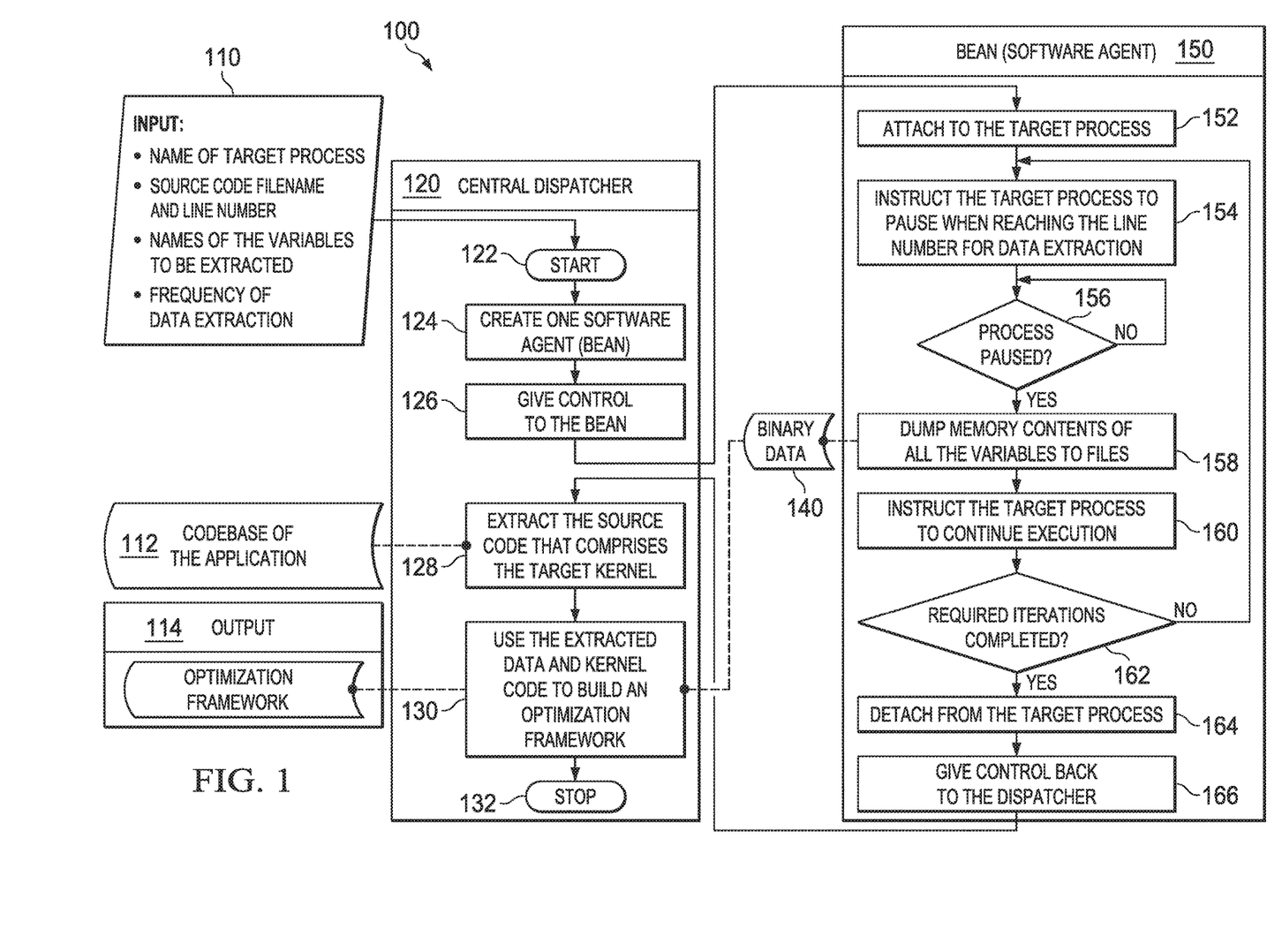
FIG. 1 illustrates a block diagram of one potential embodiment of the software optimization technique described herein, where a single process and single machine are configured.

Referring to FIG. 1, in an embodiment, a software optimization system 100 is configured to run in parallel with a single process running on a single computing system. A single computing system can include a variety of types of computers, micro-computers, mobile computers, etc., and generally refers to a system that is configured to have at least one processor, memory, an input/output system ("I/O system"), and non-volatile memory for the storage of an operating system and/or software.

Referring again to FIG. 1, the software optimization system 100, as described in conjunction with the illustrated embodiment, receives as inputs 110: the name of a target process, a source code filename, a set of line numbers for the targeted code sections, a list of the variable names to be extracted, and an intended extraction frequency. A central dispatcher 120 is run or made to start in step 122 and creates one software agent 150 (also referred to as the "Bean") in step 124. In an embodiment, the central dispatcher 120 is configured to have access to or to be integrated with the operating system kernel that is running on the single computing system. The central dispatcher 120 then takes the step 126 of giving control to the software agent 150. Once the software agent 150 has control, a number of steps can be run by the software agent 150. The software agent 150 attaches to the target process in step 152 and then instructs the target process to pause when reaching the line number for data extraction in step 154. In an embodiment, the line number for data extraction is configured to be the first line number in the set of line numbers for the targeted code sections, the second line number is then configured as the final line number to run data extraction over.

The software agent 150 then checks to see if the process has actually paused in step 156 and waits for the process to pause if it has not paused yet. Once paused, the contents of all of the variables from the list of the variable names to be extracted is dumped into a memory file in step 158. The paused process is then instructed to continue execution in step 160. A check is then performed against a counter to see if the required number of desired iterations has completed 162, if the required number has not yet completed, the software agent 150 returns to monitoring for the line number for data extraction in step 154 and again instructs the target process to pause when that line number is reached. The remainder of this sequence including each of the steps 154, 156, 158, 160, and 162, as shown in FIG. 1, will continue until the required iterations have been verified as completed in step 162. Once the required iterations have been verified as completed by the software agent 150, the agent will detach from the target process 164 and give control back to the dispatcher 120 in step 166.

Throughout the data extraction process, the software agent 150 data dumps are stored as binary data to a repository or dump file 140. Once the data extraction steps are complete and control is given back to the central dispatcher 120, the source code that comprises the target kernel is extracted 128 using the codebase of the application 112 as a resource. The extracted data from the repository file 140 and the codebase of the application 112 are then both utilized to construct in step 130 an optimization framework by populating a pre-configured optimization framework file 114 with the extracted data from the repository file 140 and the code snippets from the codebase of the application 112 that match up with the set of line numbers for the targeted code sections that were input in to the optimization routine. Code execution of the central dispatcher 120 and then stop 132 and an optimization engineer can revise the targeted program section based on observations and interactions with the optimization framework created from this process.

Figure 2:
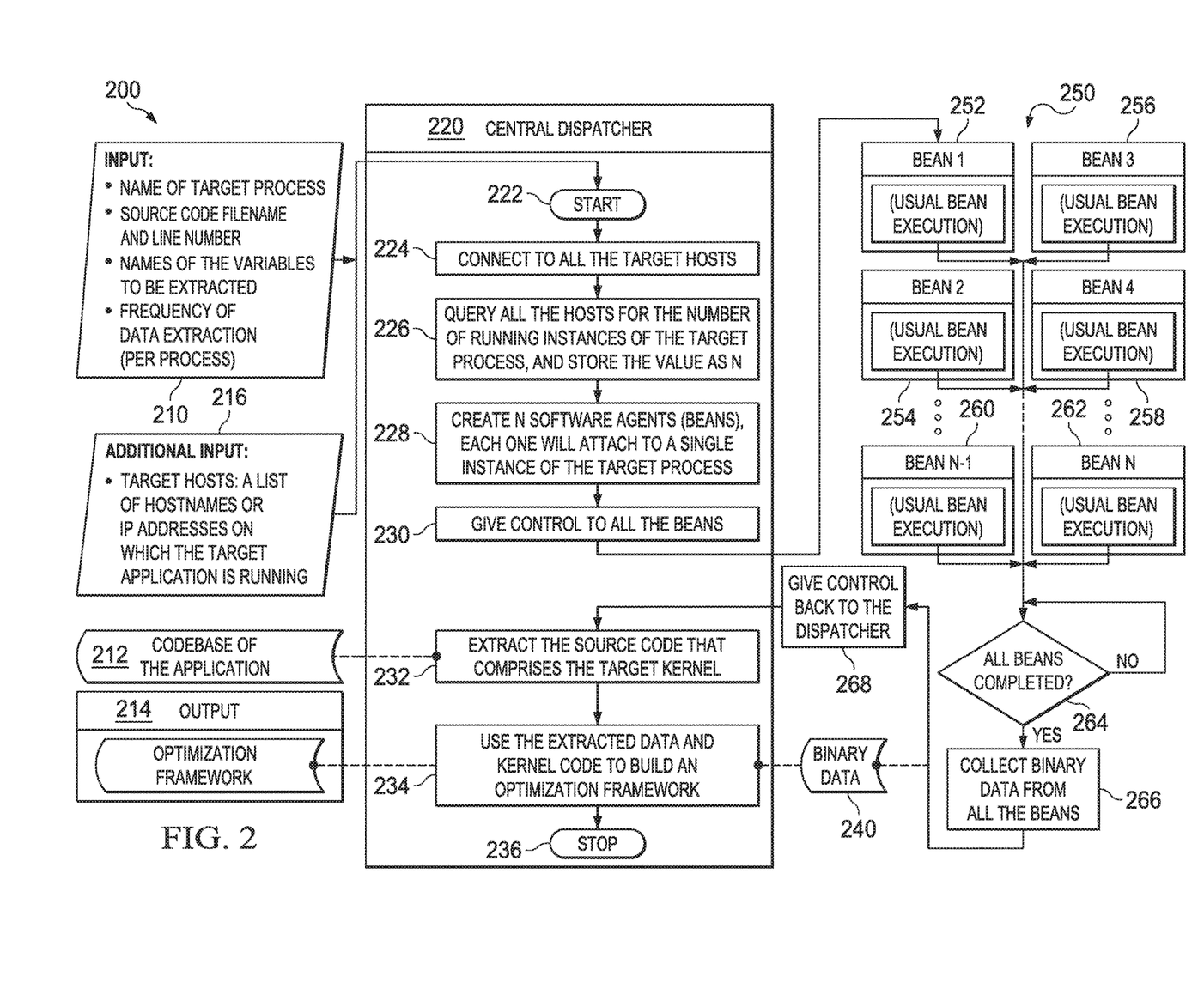
FIG. 2 illustrates a block diagram of one potential embodiment of the software optimization technique described herein, where multiple processes and multiple machines are configured.

Referring to FIG. 2, in an embodiment, a software optimization system 200 is configured to run in parallel with multiple processes running on multiple computing systems. Individual computing systems of the multiple computing systems configured can include a variety of types of computers, micro-computers, mobile computers, etc., and generally refers to systems that are configured to have at least one processor, memory, an input/output system ("I/O system"), and non-volatile memory for the storage of an operating system and/or software.

Referring again to FIG. 2, the software optimization system 200, as described in conjunction with this illustrated embodiment, receives as inputs 210: the name of a target process, a source code filename, a set of line numbers for the targeted code sections, a list of the variable names to be extracted, and an intended extraction frequency. In an embodiment, each of these inputs 210 can be the same for each of the multiple processes or they can be defined individually for each of the multiple processes.

A central dispatcher program 220 (or routine) is run or made to start 222 and creates one software agent (also referred to as the "Bean") for each of the multiple processes, such that "N" software agents are created. In an embodiment, the central dispatcher 220 is configured to have access to or to be integrated with the operating system kernel that is running on at least one of the multiple computing systems. The central dispatcher 220 takes the step of connecting to all of the target hosts 224. The central dispatcher 220 queries all of the hosts for the number of running instances of the target process and stores that value as "N" 226. This is where "N" software agents or Beans are created such that each software agent 230 will attach to a single instance of the target process 228. The central dispatcher 220 then gives control to each of the software agents 250 (representing individual software agents 252, 254, 256, 258, 260, and 262) in step 230. Once the software agents 250 have control, a number of steps can be run by the software agents 250. The software agents 250 attach to each of the respective target processes and then instructs the target processes to pause when reaching the line number for data extraction (similarly to the steps depicted in regard to a single process with respect to FIG. 1). In an embodiment, the line number for data extraction is configured to be the first line number in the set of line numbers for the targeted code sections, the second line number is then configured as the final line number to run data extraction over.

The software agents 250 then checks to see if the process has actually paused and waits for the process to pause if it has not paused yet (steps depicted in more granular details with respect to the single process embodiment of FIG. 1). Once paused, the contents of all of the variables from the list of the variable names to be extracted is dumped into a memory file with identification information in regard to the software agent writing the data. The paused process is then instructed to continue execution. A check is then performed against a counter to see if the required number of desired iterations has completed, if the required number has not yet completed, the software agent returns to monitoring for the line number for data extraction and again instructs the target process to pause when that line number is reached. The remainder of this sequence will continue until the required iterations have been verified as completed for all software agents in step 264. Once the required iterations have been verified as completed by the software agents 250, the software agents 250 will each detach from the target processes and give control back to the central dispatcher 220 in step 268. The binary data from all of the software agents 250 will be collected 266 and all of the binary data will be written to a binary data repository file 240 and transferred the central dispatcher 220. In an embodiment, the binary data that is collected is in the format this is provided by the software agents. In alternate embodiments, additional steps may be taken to reformat or reorganize the binary data being collected.

Once the data extraction steps are complete and control is given back to the central dispatcher 220, the source code that comprises the target kernel is extracted 232 using the codebase of the application 212 as a resource. The extracted data from the binary data repository file 240 and the codebase of the application 212 are then both utilized to construct in step 234 an optimization framework by populating a pre-configured optimization framework file 214 with the extracted data from the repository file 240 and the code snippets from the codebase of the application 212 that match up with the set of line numbers for the targeted code sections that were input in to the optimization routine. Code execution of the central dispatcher 220 and then stop 236 and an optimization engineer can revise the program sections based on observations and interactions with the optimization framework created from this process.

Figure 3:
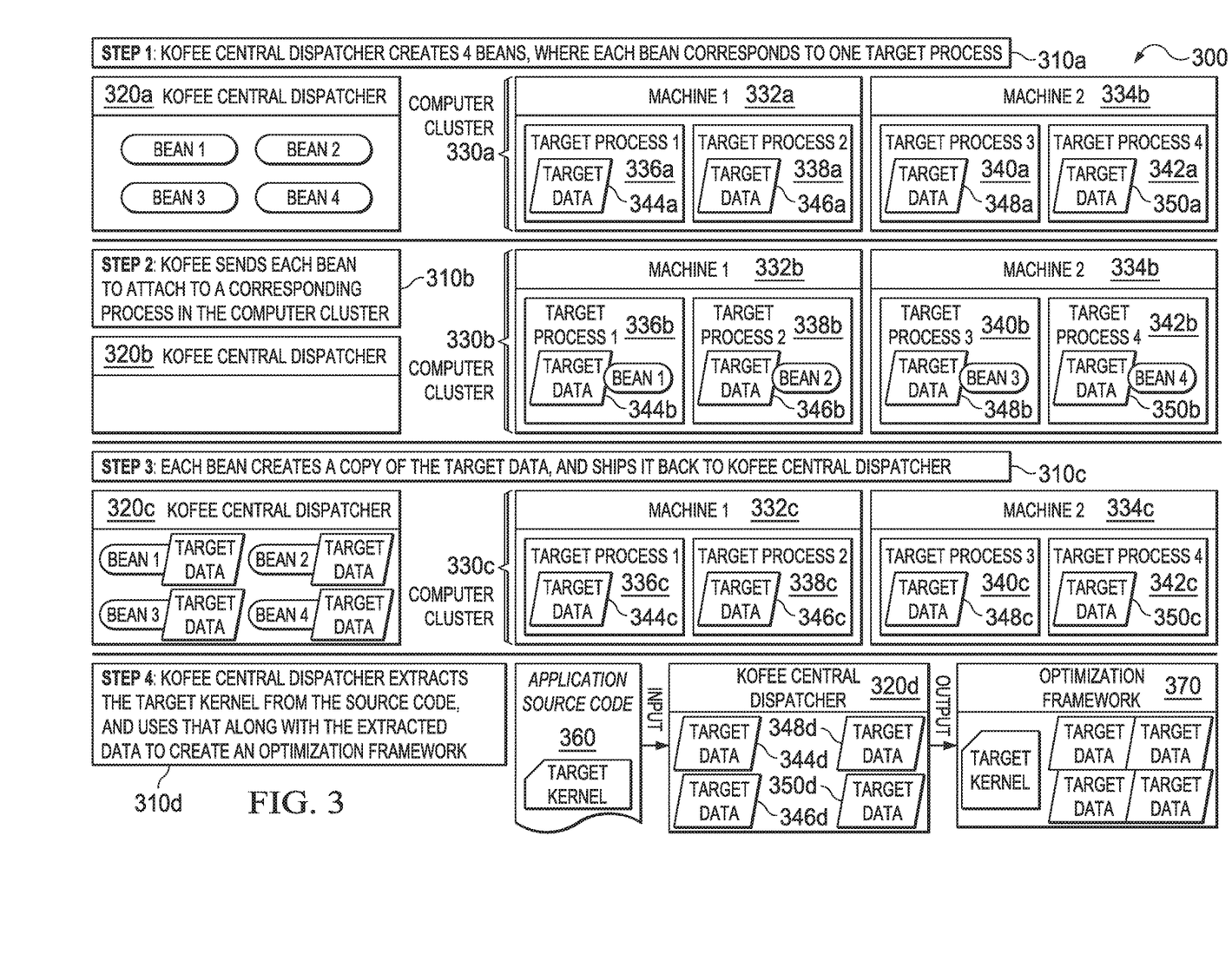
FIG. 3 illustrates a block diagram of the workflow for one potential embodiment of the software optimization technique described herein, where multiple processes and multiple machines are configured.

Referring to FIG. 3, a block diagram of the workflow 300 for one potential embodiment of the software optimization technique described herein is shown. Multiple processes and multiple machines are configured in this illustrative example. In an alternative embodiment, more computer clusters and/or additional machines and target processes can be configured. In Step 1, the central dispatcher creates four software agents 310a (which may also be referred to as "Beans"). Each software agent or Bean (shown in 320a) corresponds to one target process that a software programmer has identified and would like to optimize. The central dispatcher is initially in control of each software agent shown in 320a. A computer cluster 330a is configured with a first machine 332a and a second machine 334a. The first machine 332a is made to run a target process one 336a and a first set of target data 344a is associated with the target process one 336a. In this example, the first machine is also made to run a target process two 338a and a second set of target data 346a is associated with the target process two 338a. The second machine 334a is made to run a target process three 340a and a third set of target data 348a is associated with the target process three 340a. In this example, the second machine is also made to run a target process four 342a and a fourth set of target data 350a is associated with the target process four 342a.

Referring again to FIG. 3, in Step 2, the central dispatcher 320b sends each software agent ("Bean") to attach to a corresponding process in the computer cluster 330b. Software agent one attaches to the target process one 336b of machine one 332b and collects the first set of target data 344b as target process one 336b runs. Software agent two attaches to the target process two 338b of machine one 332b and collects the second set of target data 346b as target process two 338b runs. Software agent three attaches to the target process three 340b of machine two 334b and collects the third set of target data 348b as target process three 340b runs. Software agent four attaches to the target process four 342b of machine two 334b and collects the fourth set of target data 350b as target process four 342b runs.

In Step 3, each software agent creates a copy of its respective target data and sends the data back to the central dispatcher 320c. At the end of this step, the computer cluster 330c which consists of machine one 332c and machine two 334c has completed running the targeted code portion of target process one 336c, target process two 338c, target process three 340c, and target process four 342c and the target data 344c, 346c, 348c, and 350c has all been collected and sent back to the central dispatcher 320c. In Step 4, the central dispatcher 320d extracts the target Kernel from the source code, and uses that along with the extracted data to create an optimization framework. In this step of this embodiment, the application source code 360 from the target code kernel 360 is provided to the central dispatcher 320d as an input. The central dispatcher 320d then takes the relevant portions of targeted code from the application source code 360 and each of the target data sets 344d, 346d, 348d, and 350d, The extracted data from the target data sets and the application source code 360 are then both utilized to construct an optimization framework by populating a pre-configured optimization framework file 370. This optimization framework file then allows for a computer programmer to study and optimize code sections based on actual input and output data.

In an embodiment, the above-described technique and methods can be implemented in target applications and code sections written in C, C++, Fortran, and other similar programming languages. In terms of other similar programming languages, in implementing this technique it is helpful that the programming environments and languages support or provide robust debuggers that can conveniently extract the binary contents of specific variables and also a robust debug information reader library that can extract or help with extracting runtime information, such as the address and size of specific variables.

In general, the software configurations and techniques described herein can be used to optimize a variety of target kernels in single process or distributed software. For example, in an embodiment, the above-described technique and methods can be useful for optimizing reservoir simulation software. For example, reservoir simulation software may contain a sparse matrix vector multiplication kernel and the described configurations and techniques can be used to extract data and build an optimization framework around the sparse matrix vector multiplication kernel.

From the description provided above, numerous different embodiments of the invention including software are envisioned that can be combined with general purpose hardware. A computer system can be created with various components to carry out the methods of the various embodiments including a non-transitory computer readable medium that can contain instructions for a software program to implement the method of the embodiments.

The above disclosure is meant to be illustrative of the various embodiments of the present invention. Various modifications will become apparent to those skilled in the art once the disclosure is considered as a whole.

The invention claimed is:

1. A computer software development system for use in a non-distributed computing system comprising:
    a non-distributed computer system comprising:
        a micro-processor configured on a computer circuit board, the microprocessor configured with input/output channels,
        memory configured to be in communication with the micro-processor,
        a data bus extending between the memory and the micro-processor,
        non-volatile memory configured to be in communication with the micro-processor;
        a user-interface configured to display source code on the computer system and further configured to allow a user to edit the source code, and
        a software program stored on the nonvolatile memory that is configured to enable the micro-processor to execute a central dispatcher program that takes as inputs: a name of a target process, a filename of a source code file, a set of line numbers identifying a targeted code section in the source code file, a list of the variable names to be extracted, and an intended extraction frequency;
    the central dispatcher program configured to give control to a software agent identified by the name of the target process,
    the software agent configured to instruct the target process to pause when the first line number of the set of line numbers identifying the targeted code sections in the source code file is reached, run the target process and dump the variable data identified in the list of the variable names to be extracted to a dump data file, and then repeat this process until a predetermined number of iterations has been achieved,
    the central dispatcher further configured to populate the pre-configured optimization framework file with information from the dump data file and the relevant code sections from the source code file of the application identified by the set of line numbers identifying the targeted code sections in the source code file, thereby creating a populated optimization framework file.

2. The computer software development system of claim 1 wherein the central dispatcher receives as input the source code file of the application and the dump data file from the software agent.

3. The computer software development system of claim 2 wherein the central dispatcher receives as input a pre-configured optimization framework file.

4. The computer software development system of claim 3, wherein the computer software optimization system displays to an end user computer programmer, the populated optimization framework file and an editable version of the relevant code sections from the source code file of the application identified by the set of line numbers identifying the targeted code sections in the source code file.

5. The computer software development system of claim 4, wherein the computer software optimization system is configured to re-run edited versions of the relevant code sections using the variable data from the dump data file to thereby provide test runs with actual runtime data.

6. A method of computer software development for use in a non-distributed computing system, the method comprising the following steps:
    deploying a non-distributed computer system comprising:
        a micro-processor configured on a computer circuit board, the microprocessor configured with input/output channels,
        memory configured to be in communication with the micro-processor,
        a data bus extending between the memory and the micro-processor,
        non-volatile memory configured to be in communication with the micro-processor;
        a user-interface configured to display source code on the computer system and further configured to allow a user to edit the source code, and
        a software program stored on the nonvolatile memory that is configured to enable the micro-processor to perform the following steps:
    executing a central dispatcher program that receives as inputs: a name of a target process, a filename of a source code file, a set of line numbers identifying a targeted code section in the source code file, a list of the variable names to be extracted, and an intended extraction frequency;

executing a software agent program, the software agent program identified by the name of the target process and configured to instruct the target process to pause when the first line number of the set of line numbers identifying the targeted code section in the source code file is reached, run the target process and dump the variable data identified in the list of the variable names to be extracted to a dump data file, and then repeat this process until a pre-determined number of iterations has been achieved;

the central dispatcher further configured to populate the pre-configured optimization framework file with information from the dump data file and the relevant code sections from the source code file of the application identified by the set of line numbers identifying the targeted code sections in the source code file, thereby creating a populated optimization framework file.

7. The method of computer software development of claim 6 wherein the central dispatcher receives as input the source code file of the application and the dump data file from the software agent.

8. The method of computer software development of claim 7 wherein the central dispatcher receives as input a pre-configured optimization framework file.

9. The method of computer software development of claim 8, wherein the computer software optimization system displays to an end user computer programmer, the populated optimization framework file and an editable version of the relevant code sections from the source code file of the application identified by the set of line numbers identifying the targeted code sections in the source code file.

10. The method of computer software development of claim 9, wherein the computer software optimization system is configured to re-run an edited version of the relevant code sections using the variable data from the dump data file to thereby provide test runs with actual runtime data.

11. The method of computer software development of claim 10, wherein the computer software optimization system is configured to create a new dump data file during the re-run of the edited version of the relevant code section.

12. A method of computer software development for use in a distributed computing system, the method comprising the following steps:

deploying two or more computer systems, each computer system comprising:
a micro-processor configured on a computer circuit board, the microprocessor configured with input/output channels,
memory configured to be in communication with the micro-processor,
a data bus extending between the memory and the micro-processor,
non-volatile memory configured to be in communication with the micro-processor;
a user-interface such that a software programmer can view and revise source code on the computer system, and
a software program stored on the nonvolatile memory of at least one computer system that enables the microprocessor to perform the following steps:
executing a central dispatcher program that receives as inputs: a name of a target process, a filename of a source code file, a set of line numbers identifying a targeted code section in the source code file, a list of the variable names to be extracted, and an intended extraction frequency;
the central dispatcher further configured to populate the pre-configured optimization framework file with information from the dump data file and the relevant code sections from the source code file of the application identified by the set of line numbers identifying the targeted code sections in the source code file, thereby creating a populated optimization framework file for a distributed computing system;
a software program stored on the nonvolatile memory of each of the configured computer systems that is configured to enable the micro-processor of each system to perform the following steps:
executing a software agent program, the software agent program identified by the name of the target process and configured to instruct the target process to pause when the first line number of the set of line numbers identifying the targeted code section in the source code file is reached, run the target process and dump the variable data identified in the list of the variable names to be extracted to a dump data file, and then repeat this process until a pre-determined number of iterations has been achieved;
the software program stored on the nonvolatile memory of the at least one computer system further performing the following steps:
collecting the dump data file from each of the software agent programs.

13. The method of computer software development of claim 12 wherein the central dispatcher receives as input the source code file of the application and the contents of dump data files from each of the software agents.

14. The method of computer software development of claim 13 wherein the central dispatcher receives as input a pre-configured optimization framework file that is adapted to be populated with information from a distributed computing system.

15. The method of computer software development of claim 14, wherein the computer software optimization system displays to an end user computer programmer, the populated optimization framework file and an editable version of the relevant code sections from the source code file of the application identified by the set of line numbers identifying the targeted code sections in the source code file.

16. The method of computer software development of claim 15, wherein the computer software optimization system is configured to re-run edited versions of the relevant code sections using the variable data from the dump data file to thereby provide test runs with actual runtime data.

* * * * *